United States Patent [19]
Phillips et al.

[11] Patent Number: 5,808,586
[45] Date of Patent: Sep. 15, 1998

[54] SIDE-BY-SIDE COIL-FED ANTENNA FOR A PORTABLE RADIO

[75] Inventors: James P. Phillips, Lake in the Hills; Robert J. DeGroot, Cary, both of Ill.

[73] Assignee: Motorola, Inc., Schaumburg, Ill.

[21] Appl. No.: 803,032

[22] Filed: Feb. 19, 1997

[51] Int. Cl.⁶ .............................. H01Q 1/24; H01Q 1/36
[52] U.S. Cl. ........................................... 343/895; 343/702
[58] Field of Search .................................. 343/715, 725, 343/745, 749, 702, 855, 856, 893, 751, 722, 729; H01Q 1/24, 1/26

[56] References Cited

U.S. PATENT DOCUMENTS

| | | | |
|---|---|---|---|
| 4,121,218 | 10/1978 | Irwin et al. | 343/702 |
| 4,137,534 | 1/1979 | Goodnight | 343/895 |
| 4,229,743 | 10/1980 | Vo et al. | 343/749 |
| 4,725,845 | 2/1988 | Phillips | 343/702 |
| 4,868,576 | 9/1989 | Johnson, Jr. | 343/702 |
| 5,255,005 | 10/1993 | Terret et al. | 343/895 |
| 5,258,765 | 11/1993 | Dörrie et al. | 343/722 |
| 5,258,771 | 11/1993 | Praba | 343/895 |
| 5,274,388 | 12/1993 | Ishizaki et al. | 343/895 |
| 5,345,248 | 9/1994 | Hwang et al. | 343/895 |
| 5,353,036 | 10/1994 | Baldry | 343/702 |
| 5,365,247 | 11/1994 | Van Der Veen et al. | 343/702 |
| 5,469,177 | 11/1995 | Rush et al. | 343/895 |
| 5,572,224 | 11/1996 | Moller et al. | 343/702 |
| 5,583,520 | 12/1996 | Thill | 343/702 |
| 5,600,341 | 2/1997 | Thill et al. | 343/895 |

FOREIGN PATENT DOCUMENTS

| | | |
|---|---|---|
| 22843 | 1/1990 | Australia . |
| 2 185 635 | 7/1987 | United Kingdom . |

OTHER PUBLICATIONS

J. Holland, "Multiple Feed Antenna: Covers L, S, and C Band Segments", *Microwave Journal,* Oct. 1981, pp. 82–85.

*Primary Examiner*—Hoanganh T. Le
*Assistant Examiner*—Tan Ho
*Attorney, Agent, or Firm*—Daniel W. Juffernbruch

[57] ABSTRACT

Multiple helical coils (110, 120, 130) are placed side-by-side and coupled to a conductive straight portion (140) of an antenna to provide a multi-band antenna structure. The helical coils (110, 120, 130) are distanced from one another to sufficiently eliminate coupling interference therebetween. A portable radio capable of communication in many different frequency bands utilizing a single, compact antenna structure is thus realized.

12 Claims, 2 Drawing Sheets

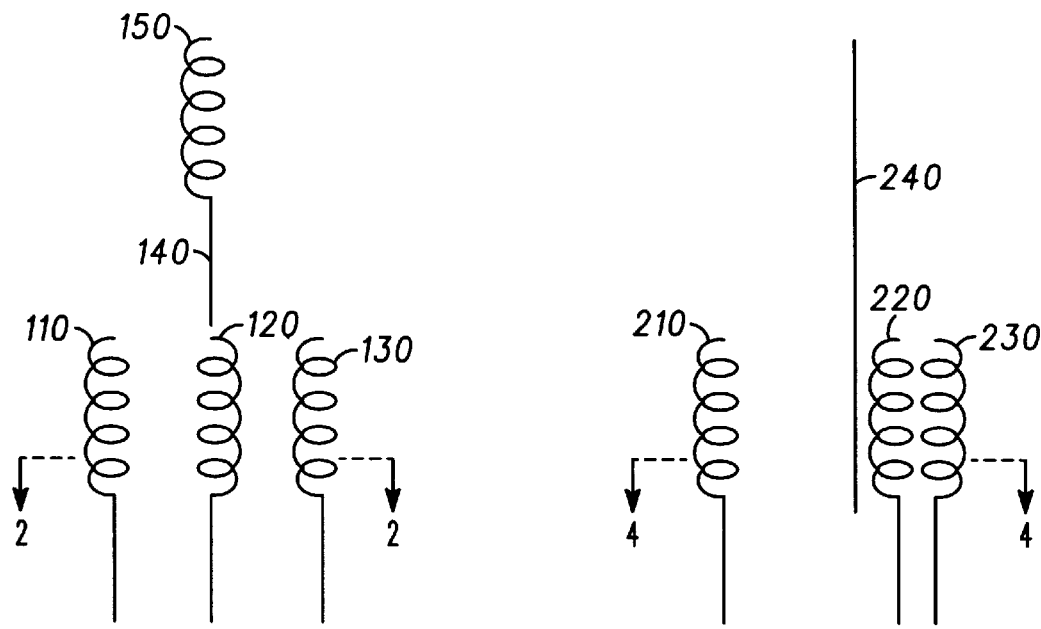
*FIG.1*        *FIG.3*
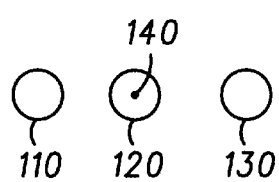
*FIG.2*
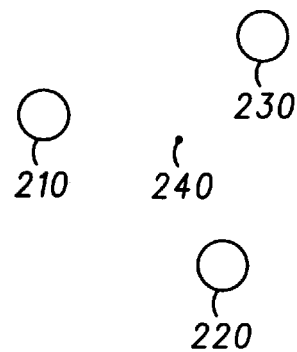
*FIG.4*

SIDE-BY-SIDE COIL-FED ANTENNA FOR A PORTABLE RADIO

BACKGROUND OF THE INVENTION

1. Technical Field

The present invention relates to antennas, and, more particularly, relates to coils for feeding multi-band antenna structures.

2. Description of the Related Art

A helical coil for coupling to an extendible, straight-wire antenna is known in the art, by, for example, U.S. Pat. No. 4,121,218 to Irwin et al. The helical coil and extendible straight-wire are dimensioned for resonance in a particular frequency band of a portable radio such as a cellular telephone.

As different analog and digital cellular telephone systems are promulgated throughout the world, antennas corresponding to each of the different cellular systems are known. Cellular telephone subscriber users, who travel through different systems or who use a cellular telephone in a geographical area with more than one system, desire a single cellular telephone usable on more than one system. Communication on differing bands of frequencies in the same radio is therefore desired. Because antennas of different bands for the same cellular telephone could likely be inconvenient for a user, a single antenna structure capable of operation at more than one band is desired.

New designs of cellular telephones are evolving to satisfy user convenience. Most users appreciate small packages which are convenient to carry and use. A multi-band antenna structure of a compact design, while achieving low manufacturing costs, is desired. Further a design capable of a stowed down position and an extended up position is desired to realize a compact stowable package.

Achieving both a compact and multi-band antenna structure capable of the high gain performance of prior single band antenna structures has been difficult. Small antennas such as are used on portable, handheld radios depend on being resonant at the operating frequency so that they are efficient and effective. Known antenna structures optimized for maximum gain in one band have design characteristics yielding sub-optimal gain at other bands. The antennas are typically assembled from resonant elements. Antenna gain performance equal to or better than existing single-band antennas is desired for all bands in a single, compact, antenna structure. This condition is easy to achieve for a single frequency, single position antenna mounted on a portable radio. For more complex structures and more extensive frequency requirements, achieving these resonant or mutually resonant conditions has not heretofore been possible before the present invention which will be explained below with reference to the accompanying drawings.

BRIEF DESCRIPTION OF THE DRAWINGS

FIG. 1 illustrates a side view of an embodiment of a multi-band antenna;

FIG. 2 illustrates a top, cross-sectional view of FIG. 1;

FIG. 3 illustrates a side view of another embodiment of a multi-band antenna;

FIG. 4 illustrates a cross-section of the antenna in FIG. 3; and

DETAILED DESCRIPTION OF THE PREFERRED EMBODIMENTS

Figure 5:
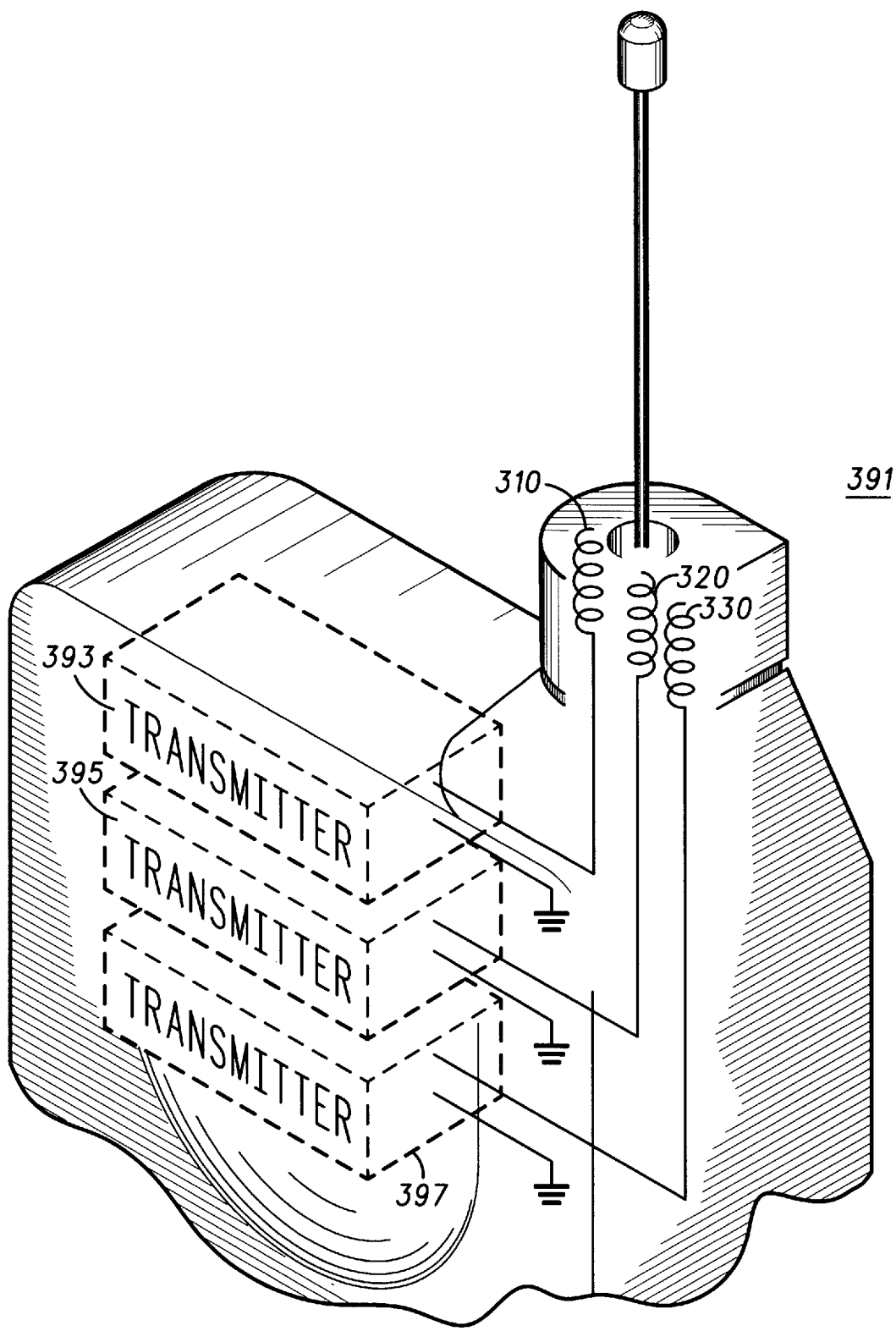
FIG. 5 illustrates a multi-band portable radio.

FIG. 1 illustrates a side view of an embodiment of a multi-band antenna. A first helical coil 110, a second helical coil 120, and a third helical coil 130 couple to a conductive straight portion 140 of an antenna element and an upper coil 150. Each of the first helical coil 110, second helical coil 120 and third helical coil 130 is resonant in their environment of the whole antenna structure at a different frequency than the other helical coils.

The first helical coil 110, second helical coil 120 and third helical coil 130 have first, second and third circumferences, respectively. Each circumference is smaller than a wavelength of the respective first, second or third frequency band of each of the first, second and third helical coils. The first and third helical coils 110 and 130 are wound in the same direction and the second helical coil 120 is wound in a direction opposite of the direction of the first and second helical coils 110 and 130.

The definition of adjacent includes coaxial and beside. Beside is another way of saying side-by side. In the embodiment of FIG. 1, the second coil 120 is coaxial with the conductive straight portion 140 and therefore is considered both adjacent to the straight portion 140. The first helical coil 110 and the third helical coil 130 are both beside the conductive straight portion 140 but not adjacent to the conductive straight portion 140 in FIG. 1. In the another embodiment of FIG. 3, all of the first, second and third helical coils are beside the conductive straight portion 140.

The first, second and third helical coils 110, 120 and 130 are spaced from one another by a coil distance to avoid coupling interference. Coupling interference between coils reduces gain efficiency of the antenna structure because energy that should be coupled between the conductive straight portion and the coil of interest is instead coupled to the other coil. When energy is transmitted from the antenna structure, preferably all of the energy radiates from the conductive straight portion. For example, when the antenna structure is used in a radio to transmit radiation energy at a first frequency band by the first coil 110, it is desired that all of the radiation energy radiates from the conductive straight portion 140 of the antenna element. Nevertheless, some of the energy will radiate from the first coil itself 110 and additionally be coupled from the first coil 110 to the second coil 120 and the third coil 130 and thereby absorbed by radio circuitry connected to the second coil 120 and the third coil 130. Energy radiated by the coil 110 and absorbed by the additional coils 120 and 130 dissipates power producing inefficient operation of the antenna structure.

The conductive straight portion 140 is disposed coaxially with the second helical coil 120. The first helical coil 110 and the third helical coil 130 are placed side-by-side next to the second helical coil 120. The coil distance between the first helical coil 110 and the second helical coil 120 and a coil distance between the third helical coil 130 and the second helical coil 120 is chosen to avoid coupling interference among the helical coils as will be described below.

Coupling accomplished via an electric field is related to and correctly described as capacitive coupling. Coupling accomplished via a magnetic field is related to and correctly described as inductive coupling. The electric and magnetic field coupling are vector quantities and often occur simultaneously. Thus their vector quantities can be added or subtracted and as such can reinforce one another or can cancel one another. It has been discovered that by geometrically arranging multiple helical coils side-by-side, the electric and magnetic (capacitive and inductive) vector quantities can be made to add and subtract to reduce electromagnetic coupling with the other helical coils and enhance electromagnetic coupling with the conductive straight portion. The combination of the electric and magnetic fields is an electromagnetic field. The first helical coil 110 and the second helical coil 120 are spaced a mast distance from the antenna element 140 and a coil distance from each other for reduced electromagnetic coupling with the respective other helical coil and enhanced electromagnetic coupling with the conductive straight portion 140.

The coil distance separating the helical coils from each other is selected to equalize the magnitude of the electric and magnetic coupling.

The direction of the turns of the helical coils relative to one another is preferably selected to cause subtraction of the vector quantities and thus minimize coupling. By the turns being opposite in direction, the magnetic field of one coil is negative with respect to the other coil. Thus oppositely wound side-by-side coils subtract rather than add the magnetic field components from one another but still efficiently couple to the conductive straight portion 140 of the antenna element.

Electric field coupling decreases inversely as the distance between the coils increases. Magnetic field coupling also decreases as the distance between the coils increases. But the magnetic field coupling decreases more rapidly than the electric field coupling with respect to the distance between the coils. The magnetic field decreases as the square of the coil distance assuming mathematical approximations valid in the small distances in the sizes used in portable devices. Thus, the coils are preferably distanced from one another where the magnitude of the electric and magnetic field coupling are equal.

The bottom end of the conductive straight portion 140 is placed near the upper ends of the helical coils. In the embodiment of FIGS. 1 and 2, the bottom end of the conductive straight portion 140 is placed near the upper end of the center, second helical coil 120, and in the embodiment of FIGS. 3 and 4 the bottom end of the conductive straight portion 140 is placed near the upper ends of each of the plurality of helical coils 210, 220 and 230. The mast distance of separation between the bottom end of the conductive straight portion and the upper ends of the helical coils determines the magnitude of electric field coupling. The greater the separation, the lower the electric field coupling. This antenna structure is preferably first approximated by electromagnetic simulation on a computer using computer programs such as the Numerical Electromagnetic Code (NEC 4.0) and then perfected by fine tuning a physical model in the laboratory. Correct coupling is indicated in both antenna gain performance and the input impedance of the antenna measured as a function of frequency. The best coupling condition occurs when a minor cusp appears in the normally circular impedance plot on a Smith chart as the mast distance between the conductive straight portion 140 and the coils 110, 120 and 130 is varied. This mast distance can be found by moving the bottom end of the conductive straight portion towards the top of a helical coil until this minor cusp appears.

The straight wire 140 can be extendible to an up position and retractable to a down position. The down position is not illustrated per se in the drawings. An upper helical coil 150 assists in the down position, although it is not necessary.

The straight wire 140 of the antenna element forms a dipole. When the straight wire 140 is positioned near the helical coils in an up position, the antenna element is simultaneously resonant at an integral multiple of ½ of a wavelength at the lower frequency one of the bands and at a same or greater integral multiple of ½ of a wavelength at the higher frequency one of the bands. When the upper coil is positioned near the helical coils, in a down position, the upper coil of the antenna element is simultaneously resonant at an integral multiple of a ¼ of a wavelength at the lower frequency one of the bands and an integral multiple of a ¼ of a wavelength at the higher frequency one of the bands.

FIG. 2 illustrates a cross-section of FIG. 1 illustrating the configuration of the first, second and third helical coils 110, 120 and 130 with respect to the conductive straight portion 140. For compactness in a flat device, the three helical coils are preferably arranged in a straight line, however, the helical coils can be arranged in an L-shape, or other shape. In the below FIG. 3, the helical coils are arranged in a triangular shape about the conductive straight portion of the antenna element.

FIG. 3 illustrates a side view of another embodiment of the antenna, and FIG. 4 illustrates a cross-section of FIG. 3. In FIGS. 3 and 4, the first helical coil 210, the second helical coil 220 and the third helical coil 230 are equidistantly spaced from a conductive straight portion 240 of an antenna element. The conductive straight portion 240 in the embodiment of FIGS. 3 and 4 does not contain an upper helical coil. However, such upper helical coil could be employed if desired. Further, the upper helical coil 150 of FIGS. 1 and 2 could be eliminated if desired. The use of an upper coil improves gain pattern characteristics of a movable antenna element when in a down position.

The conductive straight portion 140 of FIGS. 1 and 2 and the conductive straight portion 240 of FIGS. 3 and 4 are movable vertically into up and down positions.

As an alternative to three helical coils for a tri-band antenna, four helical coils may be employed for a quad-band antenna, or more helical coils as appropriate. Likewise, two helical coils may be employed for a dual-band antenna.

FIG. 5 illustrates a multi-band portable telephone having a multi-band capability. The multiband antenna structure is mounted to a top portion of a portable radiotelephone 391 with the antenna element 330 slidably disposed therein. The multi-band radiotelephone 391 has multiple transmitters 393, 395 and 397 one transmitter for each band. An active output of a first transmitter 393 is connected to a first helical coil 310. An associated ground output of this first transmitter 393 is preferably connected to a ground plane portion of the radiotelephone 391. An active output of a second transmitter 395 and a third transmitter 397 are preferably connected to a respective second helical coil 320 and third helical coil 330. The associated ground output of the transmitters 395 and 397 are preferably also referenced to associated ground. Therefore, each helical coil of the antenna structure corresponds to a different frequency of a transmitter. It is understood that the transmitters 393, 395 and 397 can alternatively be receivers and/or transceivers. Further, a single radio circuit can be employed, capable of multiple-band operation and therefore separate transmitters 393, 395 and 397 may be unnecessary.

Although the invention has been described and illustrated in the above description and drawings, it is understood that this description is by example only, and that numerous changes and modifications can be made by those skilled in the art without departing from the true spirit and scope of the invention. For example, different configurations of upper coils may be employed based on packaging requirements. U.S. patent application Ser. No. 08/801,975, Attorney Docket Number CE01308R, entitled Multi-Band Antenna Structure For a Portable Radio to DeGroot et al. and filed on Feb. 19, 1996 is specifically incorporated herein by reference.

What is claimed is:

1. A multi-band antenna structure, comprising:

an antenna element having a conductive straight portion;

a first helical coil configured for resonance at a first frequency band using a first number of turns of a first circumference and disposed beside the antenna element for electromagnetic coupling with the conductive straight portion; and a second helical coil configured for resonance at a second frequency band different than the first frequency band using a second number of turns of a second circumference and disposed adjacent to the antenna element for electromagnetic coupling with the conductive straight portion; and wherein at least the first and second helical coils are spaced a mast distance from the bottom end of the conductive straight portion of the antenna element and a coil distance from the respective other of the second helical coil and the first helical coil for reduced electromagnetic coupling with the respective other helical coil and enhanced electromagnetic coupling with the conductive straight portion.

2. A multi-band antenna structure according to claim 1, wherein the coil distance is the distance between the coils where the magnitude of the electric field coupling and the magnitude of the magnetic field coupling is approximately equal.

3. A multi-band antenna structure according to claim 1, further comprising a third helical coil configured for resonance at a third frequency band different than the first frequency band and the second frequency band using a third number of turns of a third circumference and disposed beside the antenna element for electromagnetic coupling with the conductive straight portion, wherein the third helical coil is spaced a coil distance from at least the second helical coil for reduced electromagnetic coupling with the first and second helical coils and is spaced a mast distance from the bottom end of the conductive straight portion for enhanced electromagnetic coupling with the conductive straight portion.

4. A multi-band antenna structure according to claim 1, wherein at least the second helical coil is coaxial with the antenna element having the conductive straight portion.

5. A multi-band antenna structure according to claim 3, wherein the first and third helical coils are wound in the same direction and wherein the second helical coil is wound in a direction opposite of the direction of the first and second helical coils.

6. A multi-band antenna structure according to claim 1, wherein at least the second helical coil is beside the antenna element having the conductive straight portion.

7. A multi-band antenna structure according to claim 1, wherein the antenna element comprises an upper coil connected to the straight portion at an upper end.

8. A multi-band antenna structure according to claim 7, wherein when the upper coil is positioned near the helical coils, in a down position, the upper coil of the antenna element is simultaneously resonant at an integral multiple of a ¼ of a wavelength at the lower frequency one of the bands and an integral multiple of a ¼ of a wavelength at the higher frequency one of the bands.

9. A multi-band antenna structure according to claim 1, wherein the antenna element comprises a dipole.

10. A multi-band antenna structure according to claim 9, wherein when the straight portion is positioned near the helical coils, in an up position, the antenna element is simultaneously resonant at an integral multiple of ½ of a wavelength at the lower frequency one of the bands and at a same or greater integral multiple of ½ of a wavelength at the higher frequency one of the bands.

11. A multi-band antenna structure according to claim 1, further comprising a radio circuit operatively coupled to the first helical coil and the second helical coil for amplifying respective radio frequency signals at the first band and at the second band.

12. A portable radio, comprising:

a first radio circuit for operating at a first frequency band comprising a first active connection and a first associated ground connection;

a second radio circuit for operating at a second frequency band comprising a second active connection and a second associated ground connection;

an antenna element having a conductive straight portion;

a first helical coil operatively coupled to the first active connection and configured for resonance at the first frequency band using a first number of turns of a first circumference and disposed beside the antenna element for electromagnetic coupling with the conductive straight portion; and a second helical coil operatively coupled to the second active connection and configured for resonance at the second frequency band different than the first frequency band using a second number of turns of a second circumference and disposed adjacent to the antenna element for electromagnetic coupling with the conductive straight portion; and wherein at least the first and second helical coils are spaced a mast distance from the bottom end of the conductive straight portion of the antenna element and a coil distance from the respective other of the second helical coil and the first helical coil for reduced electromagnetic coupling with the respective other helical coil and enhanced electromagnetic coupling with the conductive straight portion.

* * * * *